United States Patent
Seipold

(10) Patent No.: US 7,556,131 B2
(45) Date of Patent: Jul. 7, 2009

(54) TRANSMISSION HOUSING

(75) Inventor: John M. Seipold, Glasford, IL (US)

(73) Assignee: Caterpillar Inc., Peoria, IL (US)

( * ) Notice: Subject to any disclaimer, the term of this patent is extended or adjusted under 35 U.S.C. 154(b) by 162 days.

(21) Appl. No.: 11/274,377

(22) Filed: Nov. 15, 2005

(65) Prior Publication Data
US 2007/0107545 A1 May 17, 2007

(51) Int. Cl.
F16D 13/68 (2006.01)
F16D 21/00 (2006.01)
F16H 57/10 (2006.01)

(52) U.S. Cl. .................. 192/48.8; 192/70.2; 192/70.28; 74/606 R; 29/434

(58) Field of Classification Search ........... 192/70.2, 192/87.11, 87.14–87.17, 48.8, 48.9, 48.91, 192/70.28, 101; 74/606 R, 434, 437
See application file for complete search history.

(56) References Cited

U.S. PATENT DOCUMENTS

| | | | |
|---|---|---|---|
| 1,472,114 A * | 10/1923 | Browne | 192/70.13 |
| 1,872,250 A * | 8/1932 | Coughtry | 192/70.17 |
| 2,935,169 A * | 5/1960 | Mills | 192/85 AA |
| 3,527,121 A | 9/1970 | Moore | |
| 3,905,252 A * | 9/1975 | Zaiser | 475/280 |
| 4,019,406 A * | 4/1977 | Herr | 475/66 |
| 4,023,439 A | 5/1977 | Herr | |
| 4,129,050 A | 12/1978 | Akashi et al. | |
| 4,155,276 A | 5/1979 | Fengler | |
| 4,449,621 A | 5/1984 | F'Geppert | |
| 4,566,571 A | 1/1986 | Fujioka | |
| 4,724,745 A * | 2/1988 | Sumiya et al. | 92/107 |
| 5,009,290 A | 4/1991 | Harada et al. | |
| 5,137,131 A * | 8/1992 | Enomoto | 192/70.14 |
| 5,992,597 A * | 11/1999 | Nagai et al. | 192/85 AA |
| 6,227,340 B1 * | 5/2001 | Braford, Jr. | 192/48.7 |
| 6,508,094 B1 | 1/2003 | Gotou et al. | |
| 6,758,786 B2 * | 7/2004 | Lepelletier | 475/296 |
| 2004/0094383 A1 | 5/2004 | Kinoshita et al. | |

* cited by examiner

*Primary Examiner*—Richard M. Lorence
*Assistant Examiner*—Edwin A. Young
(74) *Attorney, Agent, or Firm*—Finnegan, Henderson, Farabow, Garrett & Dunner; David E. Roberts

(57) ABSTRACT

A transmission housing for an automatic transmission that includes a first and second plurality of circumferentially spaced inwardly extending sets of protrusions connected to an inner surface of the transmission housing configured to engage clutch assemblies of a planetary transmission. The sets of protrusions are offset from each other.

11 Claims, 5 Drawing Sheets

Fig_2_

Fig_5.
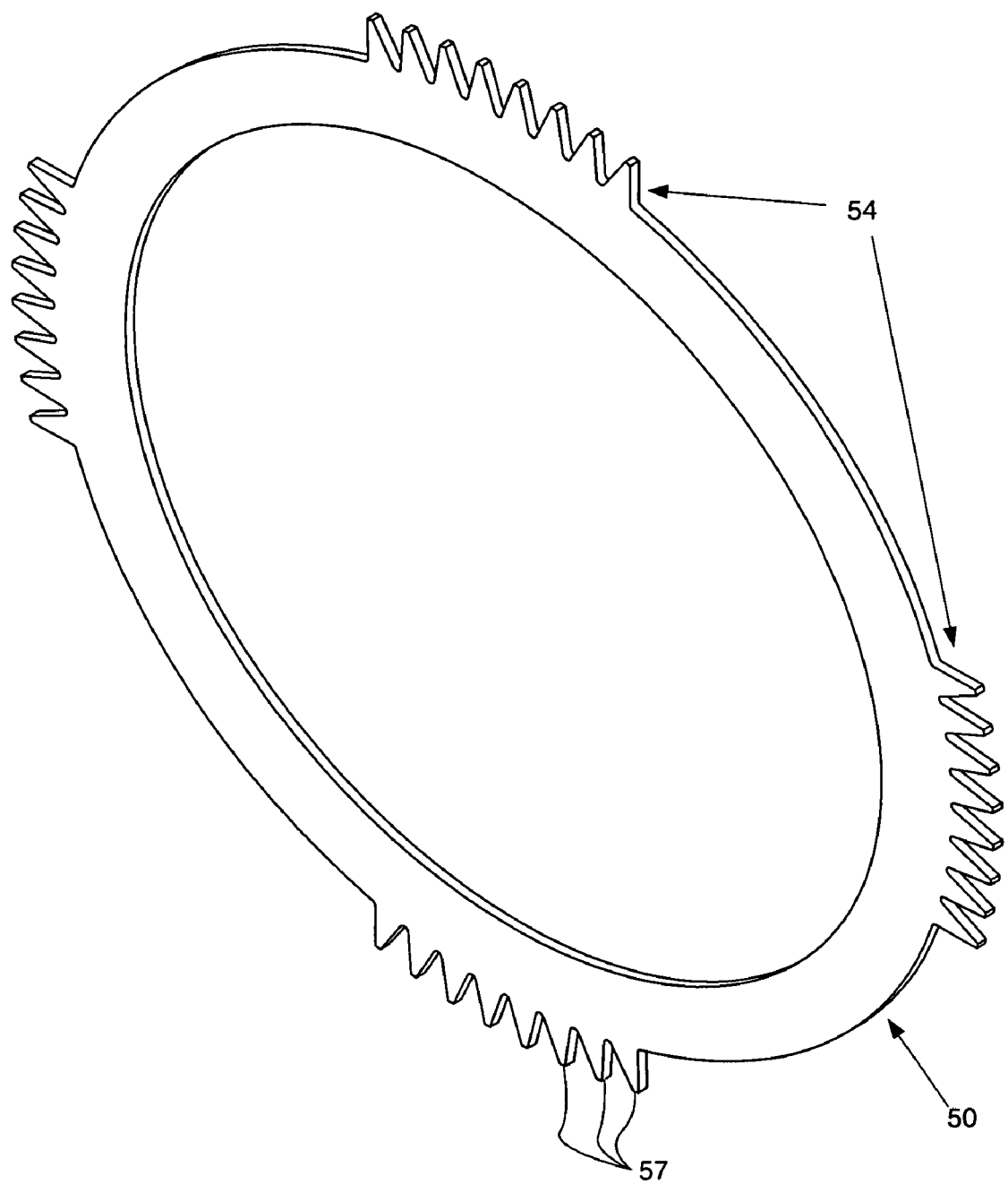

TRANSMISSION HOUSING

TECHNICAL FIELD

The present invention relates generally to transmissions, and more specifically to transmission housings.

BACKGROUND

Clutches within planetary transmissions tie two rotating components together or to a ground member, such as a transmission housing. By engaging various clutches, different gear ratios can be obtained. When the clutch is engaged a reactive torque is transmitted to the case.

U.S. Pat. No. 5,724,865 to F. Michael Boone discloses a caseless planetary transmission, which includes an integrated clutch/clutch housing. Stacking the clutch housings together creates a case. Bolts are used to tie the integrated clutch housings together so that one integrated clutch housing does not slip with respect to the other. The bolts must be long enough to pass through each of the integrated clutch housings and into the transmission housing. Due to the length of the bolts and extreme torque conditions, the bolts must be high quality. Accordingly, the bolts are expensive. Similarly, the bolts are heavy, require bolt dampers, and require precise engagement, which increases the price and weight of the transmission.

Other transmissions couple the clutch assemblies to the transmission housing through a series of clutch teeth that protrude into the transmission housing. Advantageously, torque is directly transmitted into the housing. For large transmissions having multiple planetary gear sets, casting deep sets of clutch teeth has been prohibitively expensive.

Current high production casting technology is limited to a predetermined cast depth. In other words, the tolerances of the cast product may be too great if the cast is too deep. For transmission castings, the draft is generally between one and five degrees, which may result in unacceptably long clutch teeth if the cast is too deep.

U.S. Pat. No. 1,472,104 to A. B. Browne attempts to overcome this deficiency by bolting the gear teeth to the transmission housing. Unfortunately, the torques acting on the transmission housing react across the bolted joint.

The present invention is directed to overcoming one or more of the problems identified above.

SUMMARY OF THE INVENTION

In one exemplary embodiment, an enclosure is provided. The transmission housing includes an outer surface, an inner surface, a first plurality of individual sets of clutch teeth extending from the inner surface, and a second plurality of individual sets of clutch teeth extending from the inner surface. The first and second plurality of individual sets of clutch teeth are offset from each other.

In another exemplary embodiment, a transmission is provided. The transmission includes a housing and a first and second plurality of individual sets of clutch teeth. The first plurality of individual sets of clutch teeth extend from the inner surface. The first and second plurality of individual sets of clutch teeth are offset from each other.

In yet another exemplary embodiment, a method of assembling a transmission housing is provided. The transmission includes an outer surface, an inner surface, a first plurality of individual sets of clutch teeth extending from the inner surface, and a second plurality of individual sets of clutch teeth extending from the inner surface. The first and second plurality of individual sets of clutch teeth are offset from each other. The method includes the steps of securing a first clutch assembly to the first plurality of individual sets of clutch teeth and securing a second clutch assembly to the second plurality of individual sets of clutch teeth.

BRIEF DESCRIPTION OF THE DRAWINGS

The accompanying drawings, which are incorporated in and constitute a part of this specification, illustrate exemplary embodiments of the invention and, together with the description, serve to explain the principles of the invention. In the drawings.

FIG. 5 illustrates a perspective view of a clutch plate.

DETAILED DESCRIPTION

Reference will now be made to detailed embodiments of the invention, examples of which are illustrated in the accompanying drawings.

Figure 1:
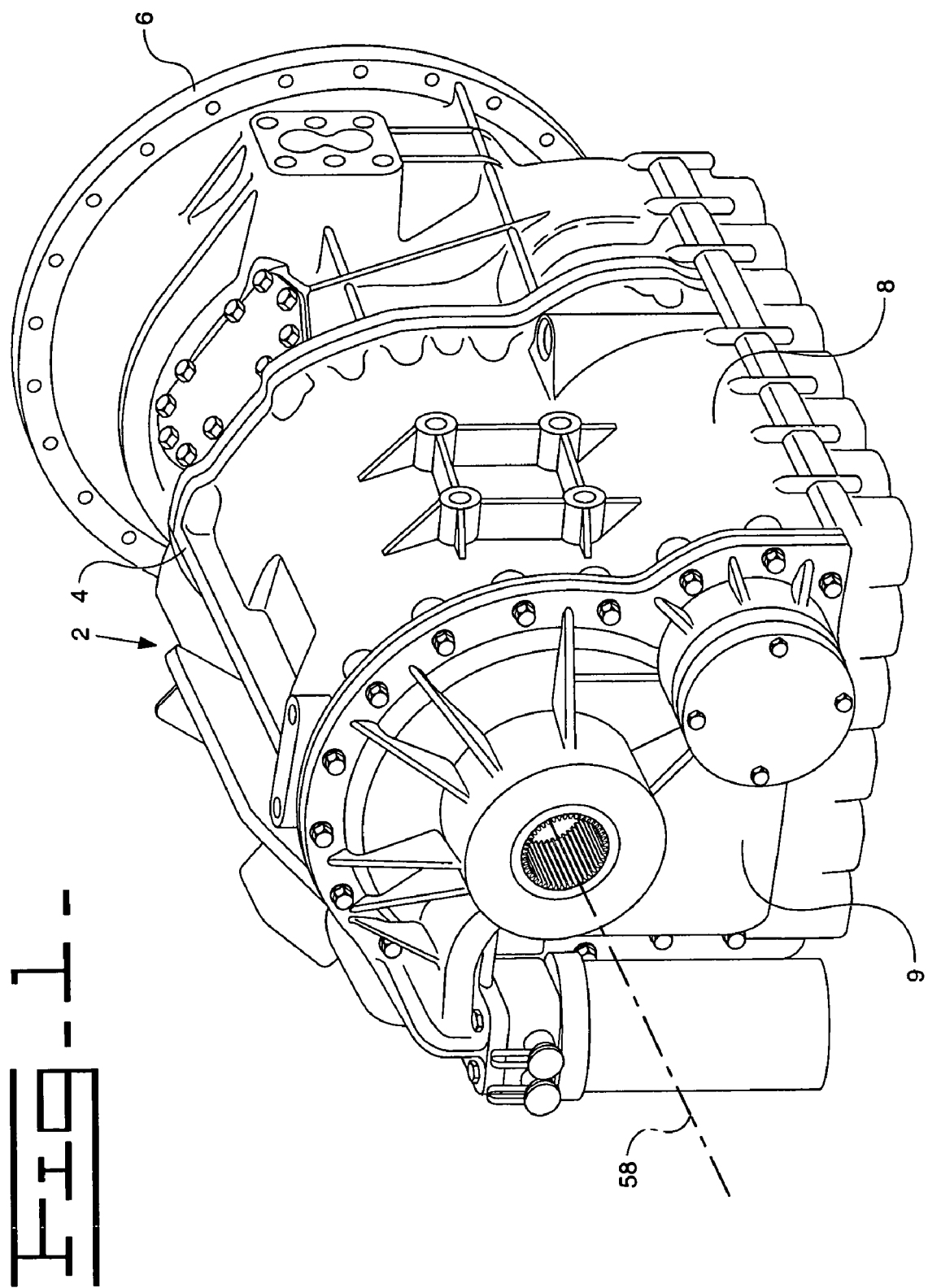
FIG. 1 illustrates a transmission according to one embodiment of the present invention.

FIG. 1 illustrates a transmission 2. The transmission 2 may be coupled to an engine (not shown), which may be, for example, an internal combustion engine or any other type of engine known in the art. The engine and the transmission 2 may be mounted within an engine compartment of a work machine (not shown) and may be configured to supply power to elements of the work machine by any conventional means.

An input shaft, or input member (not shown) of the transmission 2 directly couples an output shaft of the engine. The transmission 2 includes a transmission housing 4, having a front portion 6, a central portion 8 and a rear portion 9.

Figure 2:
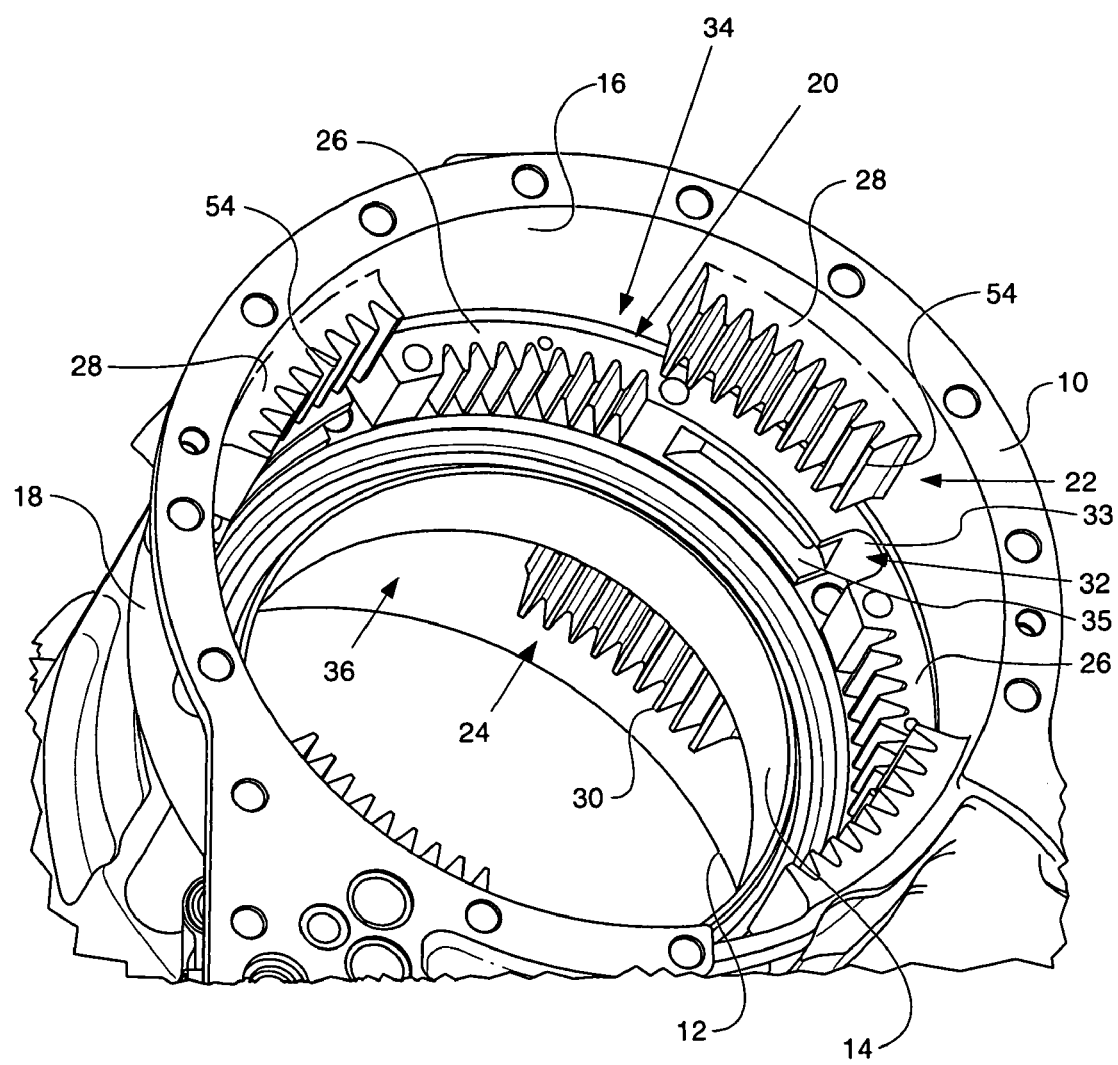
FIG. 2 illustrates a transmission housing according to one embodiment of the present invention.
Figure 3:
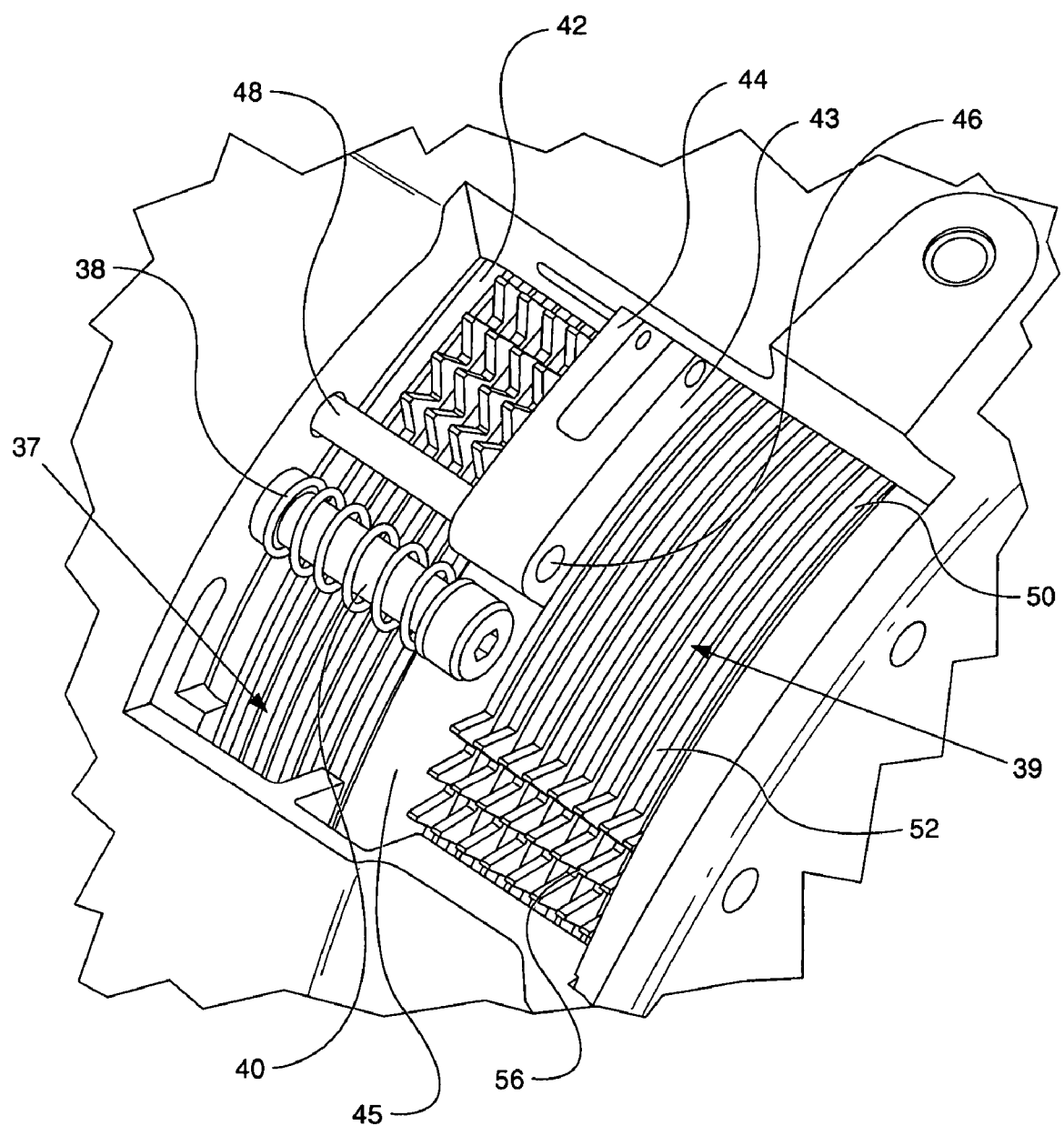
FIG. 3 illustrates a cross-sectional view of the transmission housing.

FIGS. 2 and 3 illustrate the central portion 8 of the transmission housing 4 with the front and rear portions 6 and 9 removed. The central portion 8 includes a front side 10 and a rear side 12, separated by a wall 14, and an inner surface 16 and an outer surface 18. The front side 10 of the transmission housing 4 includes a first plurality of circumferentially spaced inwardly extending protrusions, or first plurality of sets of clutch teeth 20, and a second plurality of circumferentially spaced inwardly extending protrusions, or second plurality of sets of clutch teeth 22, connected to the inner surface 16. A third plurality of circumferentially spaced inwardly extending protrusions, or third plurality of sets of clutch teeth 24, is connected to the inner surface 16 of the rear side 12. Each of the first, second, and third plurality of sets of clutch teeth 20, 22, and 24 include four sets of clutch teeth 26, 28, and 30 respectively. The sets of clutch teeth 26, 28, and 30 may be directly integrated into the transmission housing 4 or attached thereto using any known fastener, such as bolts (not shown).

The sets of clutch teeth 26, 28, and 30 are connected to the transmission housing 4 in a staggered fashion such that each set of clutch teeth 26, 28, and 30 of each of the plurality of sets of clutch teeth 20, 22, and 24 define therein between spaces 32, 34, and 36, respectively. Specifically, neighboring sets of clutch teeth 26 of the first plurality of sets of clutch teeth 20 define the spaces 32. Likewise, neighboring sets of clutch teeth 28 of the second plurality of sets of clutch teeth 22 define the spaces 34. Similarly, neighboring sets of clutch teeth 30 of the third plurality of sets of clutch teeth 24 define the spaces 36.

The spaces 32 of the first plurality of sets of clutch teeth 20 include oil drain passages 35 configured to receive draining oil from a first clutch assembly 37. Hydraulic fluid delivered to the clutch assembly 37 drains at a predetermined rate from the clutch assembly 37 into the oil drain passages 35.

The spaces 32 further include retraction spring ports 33 configured to hold clutch retraction springs 38. The clutch retraction springs 38 include a center member 40 connected to the transmission housing 4 and passing through an apply plate 42. Typically, the transmission includes at least four clutch retraction springs 38 equally spaced around the circumference of the inner surface 16 of the transmission housing 4.

A center plate 44 separates the first plurality of sets of clutch teeth 20 from the second plurality of sets of clutch teeth 22. The center plate 44 includes extensions 43, which define valleys 45, and which include alignment holes 46, used to receive alignment rods 48. The alignment rods 48 pass through the alignment holes 46 and into the transmission housing 4. The clutch retraction springs 38 extend into the valleys 45 of the center plate 44.

The clutch assemblies 37 and 39 of the first and second plurality of sets of clutch teeth 20 and 22, as well as the clutch assembly 41 (not shown) of the third plurality of sets of clutch teeth 24, include clutch plates 50 (See also, FIG. 4) and clutch discs 52. The clutch discs 52 may be connected to any rotating component of the transmission, such as the ring gear of the planetary gear set (not shown).

A second clutch apply plate (not shown) is further connected to the transmission housing 4 to press the second clutch assembly 39 against the center plate 44.

Figure 4:
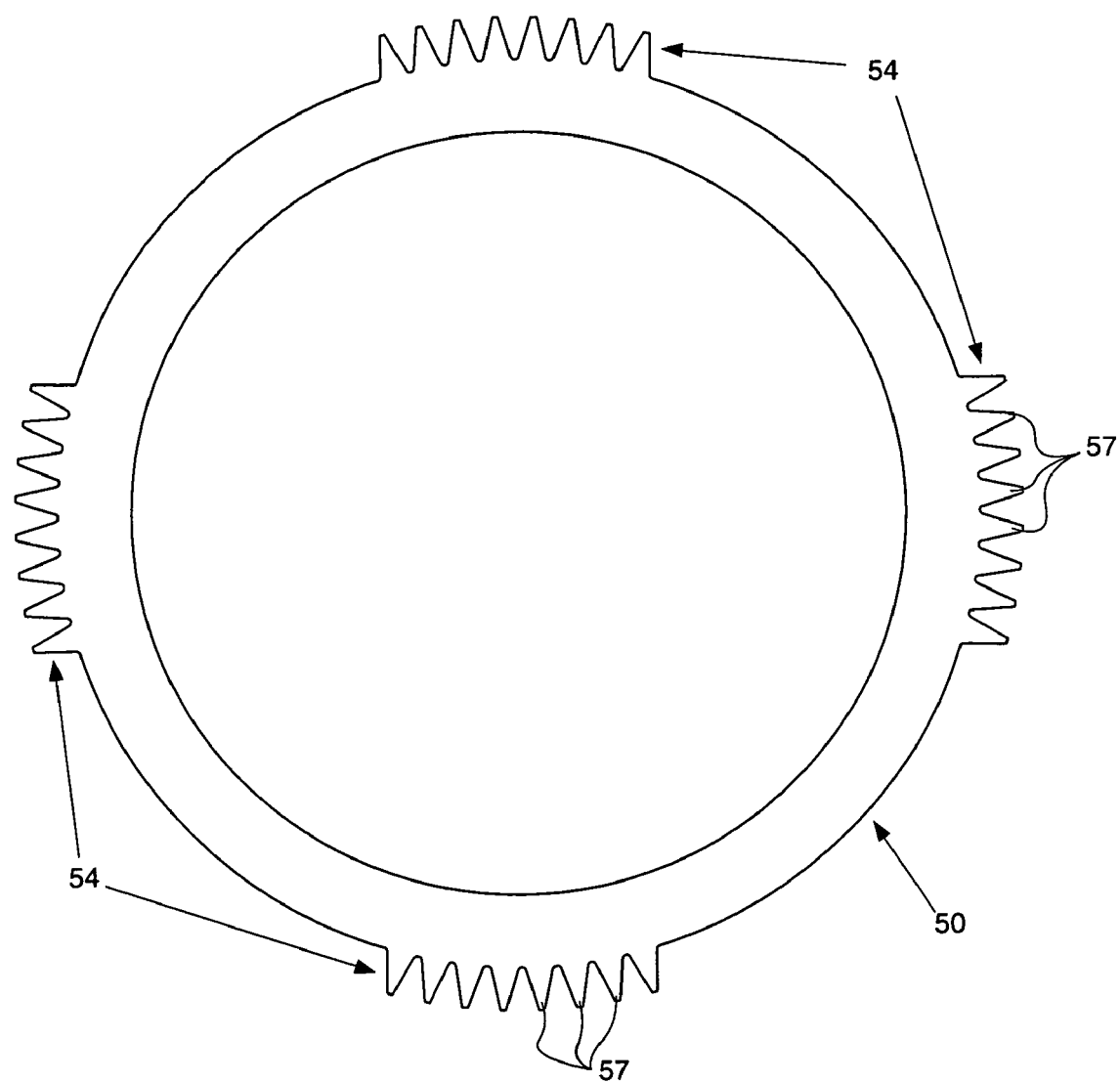
FIG. 4 illustrates a clutch plate.

FIGS. 4 and 5 illustrate the clutch plate 50. The clutch plate 50 includes sets of clutch teeth 54 configured to engage clutch teeth 56 of the sets of clutch teeth 20, 22, and 24 of the transmission housing 4. In the illustrated embodiment, there are four sets of clutch teeth 54, but it is envisioned that any number of sets may be used. Each set of clutch teeth includes individual clutch teeth 57.

INDUSTRIAL APPLICABILITY

In operation, to output a desired gear ratio associated with the first clutch assembly 37, the first clutch assembly 37 receives pressurized hydraulic fluid from a pump. The fluid causes a piston (not shown) within the first clutch assembly 37 to press against the apply plate 42. The apply plate 42 acts against the spring of the retraction spring 38 and begins to press the clutch plates 50 against rotating clutch discs 52. The clutch teeth 54 of the clutch plates 50 move axially with respect to a center axis 58 (see FIG. 1) of the transmission housing 4. The clutch plates 50 continue to move until the clutch plates 50 substantially engage the clutch discs 52 and press against the center plate 44. At substantial engagement, the transmission outputs the desired gear ratio, and exerts a torque through the clutch teeth 57 to the housing 4, through the plurality of individual sets of clutch teeth 22, 24, and 26.

Similarly, to output a gear ratio associated with the second clutch assembly 39, the second clutch assembly 39 receives pressurized hydraulic fluid from the pump. The fluid causes a piston (not shown) to press against the second apply plate. The second apply plate acts against an internal spring and begins to press the clutch plates 50 against the rotating clutch discs 52 of the second clutch assembly 39. As discussed above, the clutch teeth 54 of the clutch plates 50 move axially with respect to a center axis 58 of the transmission housing 4. The clutch plates 50 continue to move until the clutch plates 50 substantially engage the clutch discs 52 and press against the center plate 44. At substantial engagement, the transmission outputs the desired gear ratio.

The third clutch assembly 41 acts in a similar manner, as is well known in the art.

The transmission is assembled according to the following method. The apply plate 42 is placed within the transmission housing 4 and the clutch retraction springs 38 movably secure the apply plate 42 to the transmission housing 4. The first clutch assembly 37 is inserted into the transmission housing 4 against the apply plate 42, such that the clutch teeth 54 engage the clutch teeth 56 of the first sets of clutch teeth 20. The center plate 44 is placed over the clutch assembly 37 and secured to the transmission housing 4. The second clutch assembly 39 is placed within the transmission housing 4 such that the clutch teeth 54 engage the clutch teeth 56 of the second sets of clutch teeth 22. The second apply plate and associated piston and seals are positioned to engage the second clutch assembly 39.

It is noted that the method of assembling the transmission may include additional incidental steps, such as inserting seals, bolts, gaskets, etc.

It will be apparent to those skilled in the art that various modifications and variations can be made in the disclosed transmission without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A transmission comprising:
a housing, having an inner and an outer surface;
a first plurality of circumferentially spaced sets of teeth substantially equally spaced about an axis of the housing and configured to selectively engage a clutch plate, each set integrally attached to the inner surface; and
a second plurality of circumferentially spaced sets of teeth substantially equally spaced about the axis of the housing configured to selectively engage a clutch plate, each set integrally attached to the inner surface;
wherein each set of the first plurality is circumferentially and axially offset from each set of the second plurality.

2. The transmission according to claim 1, wherein
each set of the first and second pluralities is formed with the housing.

3. The transmission according to claim 1, wherein the first and second pluralities include a plurality of individual groups of teeth interspaced with a plurality of spaces void of teeth, the respective spacing between individual groups of teeth of the first and second pluralities is greater than the respective spacing between individual teeth of individual groups of teeth of the first and second pluralities.

4. The transmission according to claim 1, further comprising a third plurality of circumferentially spaced sets of teeth, each set integrally attached to the inner surface, the third plurality separated from the first and second pluralities by a wall of the housing.

5. The transmission according to claim 4, wherein at least one set of clutch teeth of the first plurality is circumferentially offset from at least one set of clutch teeth of the third plurality.

6. The transmission according to claim 4, wherein the first and third pluralities are adjacent a housing wall, and the second plurality of circumferentially spaced inwardly extending sets of protrusions is adjacent the first plurality and disposed on a side thereof opposite the housing wall.

7. The transmission according to claim 1, further comprising:
   an actuator operative to apply a pressure against at least one clutch plate to prevent movement of a component; and
   at least one actuator retraction member positioned between adjacent sets of clutch teeth, and configured to disengage the clutch plate to allow movement of the component.

8. The transmission of claim 1, further comprising a third plurality of circumferentially spaced sets of teeth configured to selectively engage a clutch plate, each set integrally attached to the inner surface, wherein:
   the first, second, and third pluralities are axially offset from one another; and at least one set of at least one of the first, second, or third pluralities is axially aligned with at least one set of another one of the first, second, or third pluralities.

9. A method of assembling a transmission having a transmission housing with an outer surface and an inner surface, a first plurality of circumferentially spaced inwardly extending sets of protrusions, each set of the first plurality connected to the inner surface and spaced from adjacent sets by a first space, a second plurality of circumferentially spaced inwardly extending sets of protrusions, each set of the second plurality connected to the inner surface and spaced from adjacent sets by a second space, wherein the first and second pluralities are axially offset from each other and at least one set of the first plurality is circumferentially offset from at least one set of the second plurality and circumferentially aligned with a second space, the method comprising the steps of:
   securing a first clutch assembly to the sets of protrusions of the first plurality; and
   securing a second clutch assembly to the sets of protrusions of the second plurality.

10. The method according to claim 9, wherein the first and second clutch assemblies each comprise at least one clutch plate having teeth that intermesh the sets of protrusions of the first and second pluralities, respectively, and at least one rotating disc connected to a rotatable component of at least one planetary gear set.

11. The method of claim 9, wherein the transmission has a third plurality of circumferentially spaced inwardly extending sets of protrusions, each set of the third plurality connected to the inner surface and spaced from adjacent sets of the third plurality by a third space.

* * * * *